United States Patent

Nowacek

[11] Patent Number: 6,151,859
[45] Date of Patent: *Nov. 28, 2000

[54] ROOF SHINGLES AND A METHOD OF MAKING THE SAME

[76] Inventor: David Nowacek, 1100 NE. Loop 410, Suite 617, San Antonio, Tex. 78209

[*] Notice: This patent is subject to a terminal disclaimer.

[21] Appl. No.: 09/171,893
[22] PCT Filed: Nov. 26, 1997
[86] PCT No.: PCT/US97/21911
§ 371 Date: Oct. 28, 1998
§ 102(e) Date: Oct. 28, 1998
[87] PCT Pub. No.: WO98/23826
PCT Pub. Date: Jun. 4, 1998

Related U.S. Application Data

[63] Continuation-in-part of application No. 08/826,027, Mar. 28, 1997, Pat. No. 5,873,208
[60] Provisional application No. 60/031,864, Nov. 27, 1996.

[51] Int. Cl.⁷ ..................................................... E04D 1/22
[52] U.S. Cl. ................. 52/518; 52/544; 52/549; 52/557; 52/745.2; 52/748.1; 52/DIG. 9
[58] Field of Search ................... 52/DIG. 9, 518, 52/544, 549, 557, 745.2, 748.1

[56] References Cited

U.S. PATENT DOCUMENTS

| | | | |
|---|---|---|---|
| 3,803,792 | 4/1974 | Fulton | 52/DIG. 9 X |
| 5,086,552 | 2/1992 | Moore | 52/DIG. 9 X |
| 5,675,954 | 10/1997 | Garcia | 52/DIG. 9 X |
| 5,873,208 | 2/1999 | Nowacek | 52/DIG. 9 X |

*Primary Examiner*—Christopher T. Kent
*Attorney, Agent, or Firm*—Jackson Walker

[57] ABSTRACT

Roof shingles (14) from used tires (10) are provided as well as a method of making the same. Used tires (10) are cut along the circumference on each edge to separate a tread piece (13) from the side walls (12) and the bead steel. Tread piece (13) is then cut by dye, shear or other method into a number of shorter pieces or shingles (14). The shingles are then secured in overlapping relationship, typically tread side outward, to form a waterproof covering on a building or other structure.

22 Claims, 4 Drawing Sheets

ROOF SHINGLES AND A METHOD OF MAKING THE SAME

This application is acknowledged to be a continuation-in-part of application Ser. No. 08/826,027, filed Mar. 28, 1997, now U.S. Pat. No. 5,873,208; which claims the benefit, under 371 U.S.C. 119(e), of provisional application Ser. No. 60/031,864, filed Nov. 27, 1996.

FIELD OF THE INVENTION

The present invention relates to a method of utilizing tire pieces as shingles in building construction, and a roof or wall shingle or covering made from tire tread.

BACKGROUND OF THE INVENTION

Scrap tires represent a significant waste disposal problem. Improper disposal results in increased human health risks and environmental damage. A number of issued patents are directed at the disposal problem by providing for recycling vehicle tires as shingles. For example, U.S. Pat. No. 5,086,552 (Moore 1992) discloses a method of recycling a vehicle tire comprising cutting the vehicle tire into separate pieces by radial cuts, each extending from the inner periphery to the outer periphery of the tire, and securing such cut tire pieces in overlapping relationship as shingles for a roof. U.S. Pat. No. 3,803,792 (Fulton 1974) also discloses a method for constructing a tire roof. The '792 patent illustrates a method for constructing a roof covering out of vehicle tires with the tires being cut and segmented in a specific manner. The '792 patent also discloses use of the tread portion segmented into flat portions to form one type of roof covering. The tread portion shingles disclosed are laid lengthwise perpendicular to the pitch of the roof.

The object of the present invention is to convert scrap tires into other useful products.

A further object is to provide a shingle product that appears and handles similarly to conventional shingles.

It is a further object of the present invention to provide, from a vehicle tire a shingle for a building structure, the shingle whose appearance is altered to disguise the fact that the origin of the shingle is a tire.

To this end, tires are cut along the circumference on each edge separating the tread piece from the side walls and bead steel. The tread piece is then cut by die, shear or other mechanical device or thermal means into shorter pieces or shingles. These shingles are then secured in an overlapping relationship as conventional shingles, tread side outward to form a waterproof covering on a building or structure, for example, on a roof and/or wall(s) of a building or structure.

Different surface appearances may be obtained by altering or removing the tread pattern by means of cutting, shaving, buffing, coloring, coating or applying heat or certain chemicals before or after the tread piece has been separated from the side wall, prior to or after the tread piece has been cut into shingles. In addition, the surface appearance of the shingle may be altered by applying an adhesive coating or a product like PLIOTEC® 7217 which in turn, while still wet, may be coated with materials like crushed stone, portland cement, ceramic coated stone granules, iron oxides, aluminum oxides, graphite and other suitable powder or aggregate or any other material. The PLIOTEC® can also be tinted to achieve a color coating. The edges of each shingle may be cut to a desired pattern, for example: straight-cut, scalloped, pointed, etc.

Shingles may also be attached to a backing material member (such as plastic, metal, wood, rubber, asphalt or fiberglass sheathing etc.) to create a unitized shingle panel. Attaching shingles to a single-ply or multi-ply backing material member significantly decreases shingle installation time, increases weather resistance, and, depending on the backing material, the strength and fire resistance of the roof system.

Individual shingles are attached to the backing material by mechanical fasteners, rivets, staples, screws, glue, mastic, or by crimping or vulcanizing (melting) the backing material member to the shingle.

Unitized shingle panels can be any size to facilitate installation and can be secured to the structure by nails, screws, staples or pneumatic fasteners.

DETAILED DESCRIPTION OF THE PREFERRED EMBODIMENT

Figure 1:
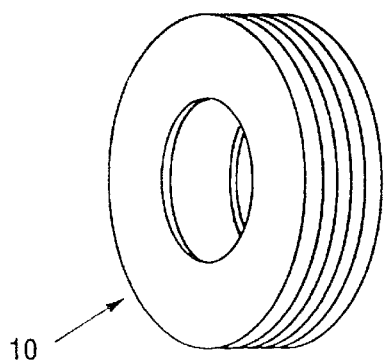
FIG. 1 shows a vehicle tire prior to cutting.
Figure 2:
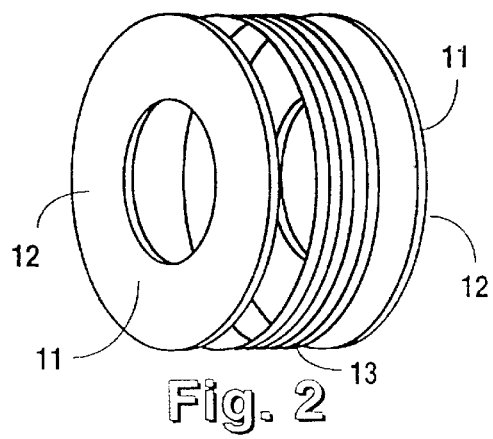
FIG. 2 shows an expanded view of the tire after both side walls are cut away by means of perimeter cuts along the circumference of the tire creating the tread piece.

FIG. 1 indicates a vehicle tire 10 which may or may not have a tread pattern remaining. The tire 10 is converted to other useful products by cutting along each perimeter edge 11 along the circumference of the tire. The usual cut is done along the outside edge of the tread portion of the tire. Where the flat section of tread starts to bend into the side wall, there are sometimes "ears" or "shoulders" which curve downward at the edge of the tread. These may, in the alternative, be cut off to produce a flatter-shaped shingle with a more uniform thickness. The cutting machine usually has a circular blade or is a side wall remover known in the art.

Once cut, what remains are side wall pieces 12 (typically two per tire) and a tread piece 13. The outer surface of tread piece 13 may be textured or the tread pattern removed or otherwise altered in appearance to reduce the degree of thickness, to reduce the weight of the shingle, and to mask the fact that the shingle is manufactured from tire treads to improve the appearance of the shingle, and to provide a suitable surface for applying various coating materials. The texturing or removal of the tread pattern may be accomplished by utilizing a buffing machine, a rasp, a planer, surfacer or other suitable machine, a heated tool or by chemical means before or after cutting the tread strip into shingles.

Figure 3A:
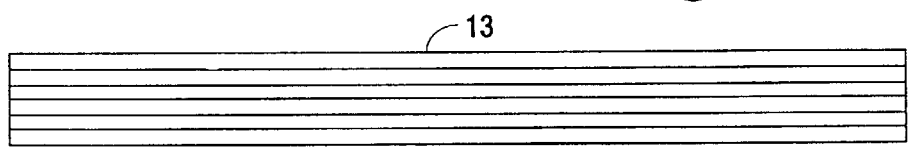
FIG. 3a shows the tread piece from FIG. 2.
Figure 3B:
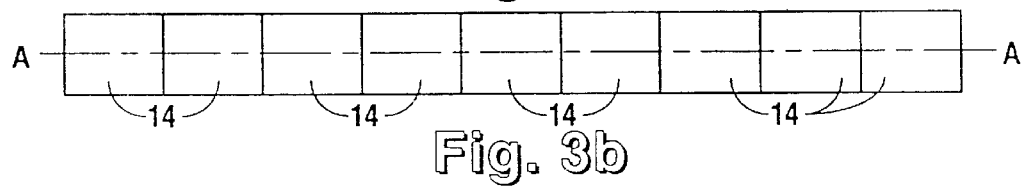
FIG. 3b shows the tread piece from FIG. 3 with the tread pattern altered and cut into shorter pieces or shingles.
Figure 3C:
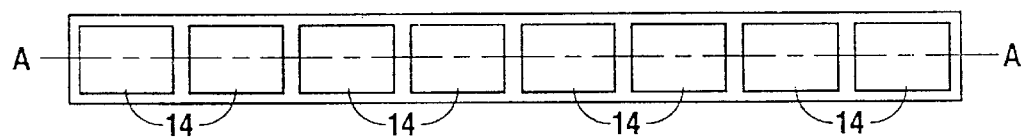
FIG. 3c shows the tread piece from FIG. 3a with the tread pattern altered and cut by die into shorter pieces or shingles.
Figure 4A:
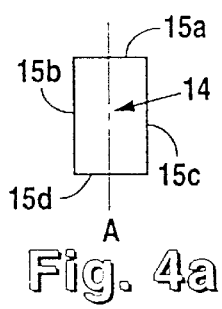
FIGS. 4a–4c show examples of shingles from FIG. 3 with various edge patterns.
Figures 4B, 4C:
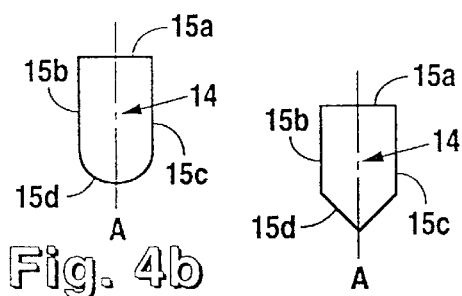

Tread piece 13 is cut by a die, shear or other mechanical device or by thermal means as shown in FIG. 3 into shorter pieces or shingles 14. Shingles 14 may have various edges applied or cut to achieve a desired architectural effect as shown in FIGS. 4a–4c.

Figure 5:
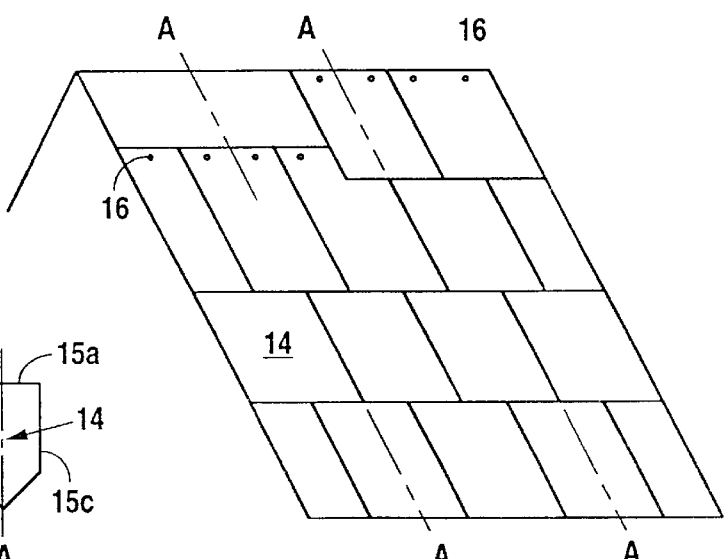
FIG. 5 shows multiple shingles from FIGS. 3b–3c and 4 arranged in a mutually overlapping manner to form a waterproof covering, as shingles on a roof or wall.

As previously indicated, the appearance of shingles 14 may be changed by removing all or part of the visible tread lines by texturizing utilizing a buffing machine, a rasp, a planer, a surfacer or other suitable mechanical device or by the use of chemicals or a heated tool, or other thermal means. In addition, the appearance of shingles 14 may be changed, with or without visible tread lines in evidence, by applying a tinted coating in any color, by applying an adhesive or product like PLIOTEC® and the applying, while still wet, crushed stone, portland cement ceramic coated stone granules, iron oxides, aluminum oxides, graphite and other suitable powder or aggregate or other material. Shingles 14 can also be treated with fire retardant chemicals and other substances to achieve greater fire resistant qualities. The finished shingles 14 may then be applied to a roof or a wall of a building structure as shown in FIGS. 5 and 10 with the tread side facing outward which would allow the natural curve of the shingle (along its longitudinal axis) to curve downward overlapping the shingle below.

Figure 6:
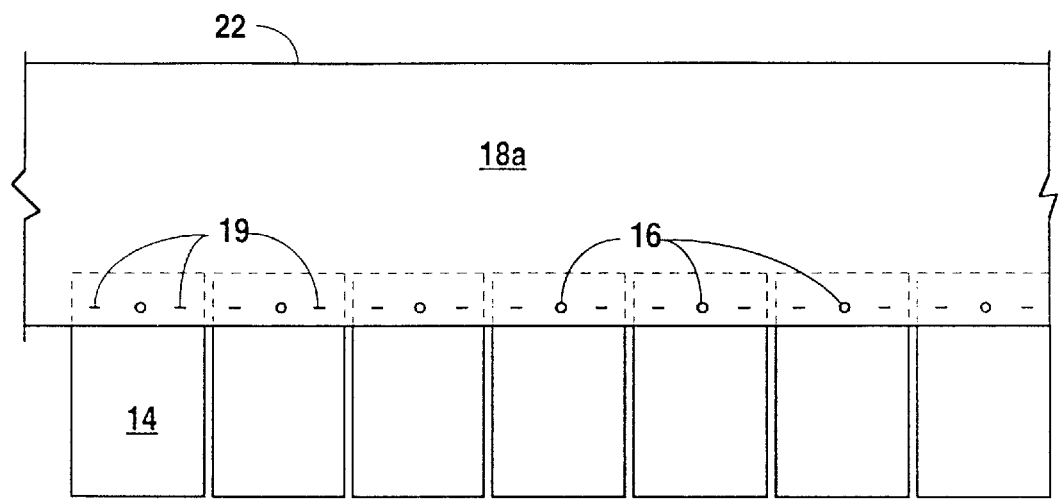
FIG. 6 shows a backing material member with shingles from FIGS. 3 and 4 attached to form a unitized shingle panel.
Figure 8:
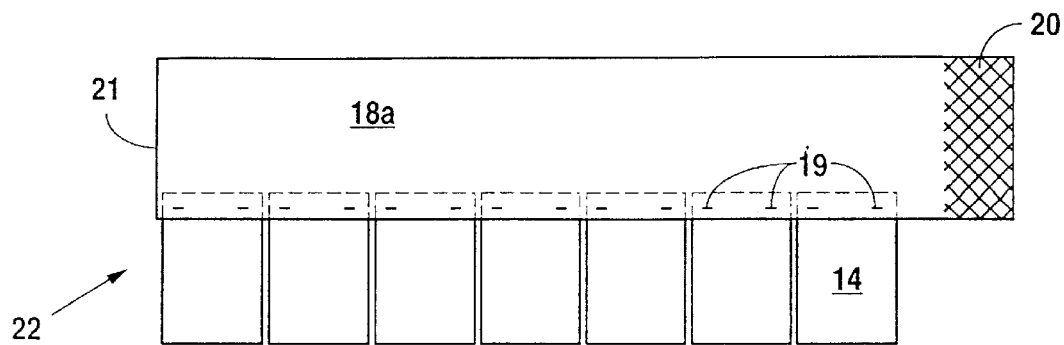
FIG. 8 shows a unitized shingle panel from FIGS. 6 and 7a showing a lap edge (cross hatched for clarity).

Prior to installation, shingles 14 may be attached to a backing material member 18a shown in FIG. 6 which is typically rectangular to form a unitized panel 22. The backing material member may be made of plastic, metal, wood, rubber, etc. The shingles are attached to the backing material member 18a by fasteners 19, such as mechanical fasteners, rivets, staples, screws, or with glue, mastic, or by crimping or vulcanizing (melting) backing material member 18a to shingles 14. A preferred fastener is a staple available from Senco Co. that penetrates only partially through the backing material member, thus giving a thinner profile to the panel. A preferred backing material is 10–40 mil HDPE. A length of backing material is left unattached to shingles to form a lap edge 20 (the cross-hatched portion) as shown in FIG. 8. Unitized panels 22 result from such attachment and have the longitudinal axis of the backing material member generally perpendicular to the axes of the shingles. The unitized panels 22 will also have a straight edge 21 as shown in FIG. 8.

Figure 7A:
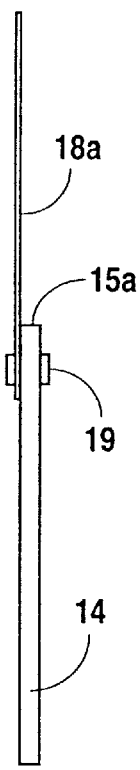
FIG. 7a shows a side elevational view of a unitized shingle panel from FIG. 6.
Figure 7B:
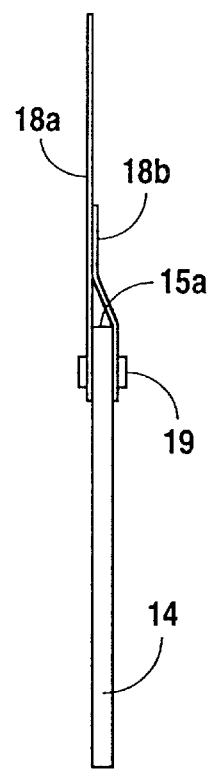
FIGS. 7b and 7c are side elevational views of a unitized shingle panel showing other methods which entail the attachment of a partial and full second backing material member.
Figure 7C:
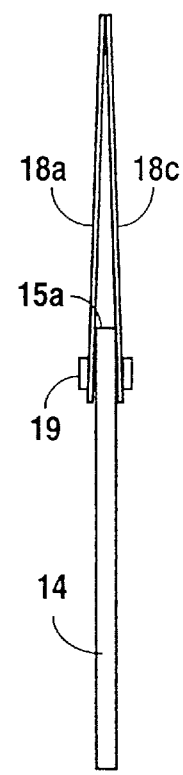

FIGS. 7b and 7c illustrate the use of a second backing material member 18b or 18c to sandwich the upper edge of shingle 14 by fastening both sections of the backing material members and the shingle together. FIG. 7b illustrates a shortened second backing material member 18b attached to backing material member 18a and shingle 14. FIG. 7c illustrates a full-width backing material member 18c attached to backing material member 18a and shingle 14. When utilizing a second backing material member, it may be comprised of the same or different materials than the first backing material member. The two backing material members may be fastened one against the other before installation on a roof or wall, or may be joined as part of fastening the unitized panel to the roof or wall.

Figure 9:
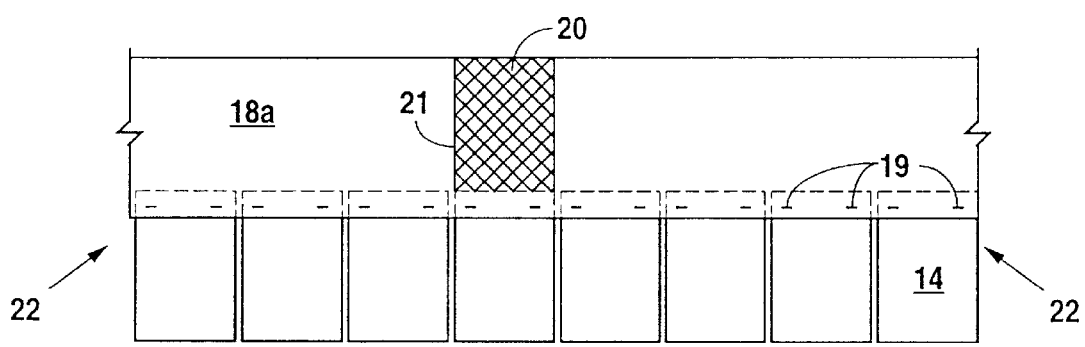
FIG. 9 shows two unitized shingle panels from FIG. 8 joined by a lap edge from FIG. 8.
Figure 10:
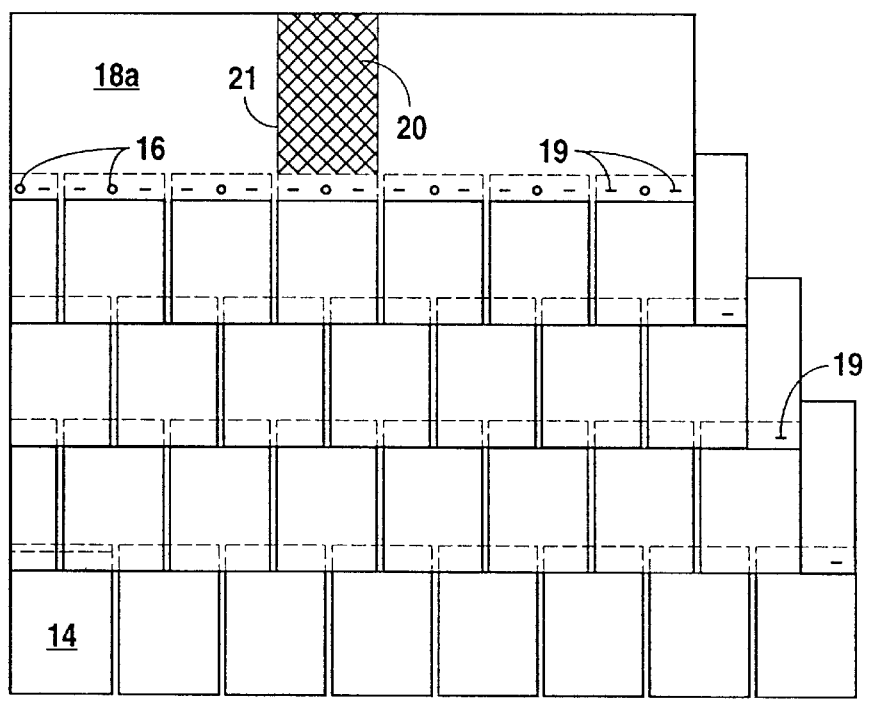
FIG. 10 shows multiple unitized shingle panels from FIGS. 6, 7a, 8, and 9 arranged in a mutually overlapping manner to form a waterproof covering, as shingles on a roof or wall.

Unitized panels 22 may be applied to a roof or wall by placing lap edge 20 of one panel, the cross-hatched portion, over the straight edge 21 of an adjacent panel to form a water-tight joint, as shown in FIGS. 9 and 10.

Unitized panels 22 may be installed on a roof or wall as shown in FIG. 10 by fastening each panel over the panel below in a mutually overlapping manner to form a waterproof covering.

It is noted here that applicant's unique method includes, in a preferred embodiment, installing the shingles in the standard vertical overlap method with the outer surface or tread side exposed or otherwise facing up as set forth in FIG. 5. Moreover, it is noted that the shingles are placed with the longitudinal axis "A" (see FIG. 5) aligned with the pitch of the roof. Applicant's method is advantageous in that it provides a more effective seal.

Shingles 14 are secured by fasteners 16 in a variety of patterns to a roof or a wall 17 as indicated in FIG. 5.

The present invention includes shingles cut from the tread portion of a tire, preferably steel-belted tires, wherein the shingles have four edges designated in FIGS. 4a–4c as lower edge 15d, side edges 15b and 15c, and upper edge 15a. As can be seen in FIGS. 4a–4c and 5, the two side edges and the upper edge are typically made with the two side edges 15b and 15c parallel to one another and perpendicular to upper edge 15a. In the embodiment indicated in FIG. 4a at the top, lower edge 15d is also perpendicular to produce a rectangular shingle. In the middle and bottom embodiments illustrated in FIGS. 4b and 4c, lower edge 15d is curved and pointed respectively. Nonetheless, in all the embodiments illustrated, it is noted that the three edges 15b, 15c and 15a stand as set forth above and create shingle 14 which is then applied to a roof or wall preferably with the longitudinal axis set parallel to one another and aligned with the pitch of the roof or wall.

Figure 11:
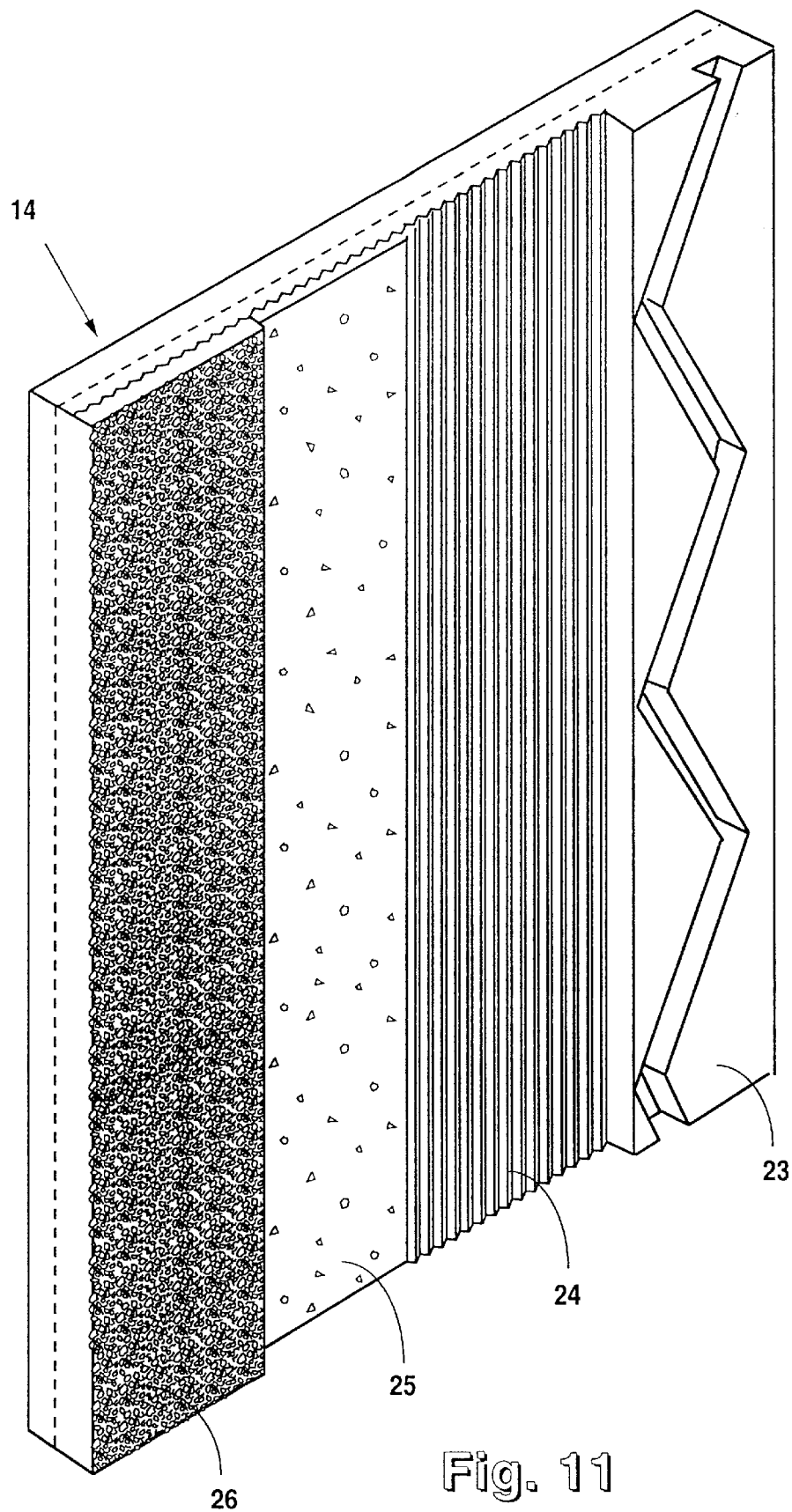
FIG. 11 shows a shingle from FIGS. 3a–3c with different stages of appearances showing a plain, unaltered tread surface pattern; a shaved or buffed pattern, a coating of paint, adhesive, sheet metal or other material and a surface of a granular material.

FIG. 11 shows a shingle 14 in various stages of treatment, treatment meaning the alteration of the appearance of the shingle to disguise or mask the fact that the shingle originated from a tire. FIG. 11 shows untreated tread surface 23 as having some or all of the tread pattern showing. The outer tread surface 23 is buffed or textured to remove the tread pattern by mechanical means to achieve a scratched or mechanically altered surface 24 with many grooves parallel to the longitudinal axis of the shingle for improved aesthetics and to facilitate water runoff and to facilitate adhesion of paint, adhesive, asphalt, sheet metal, plastic, epoxy or rubber or other material to achieve a smooth, fire resistant coating and to provide color to the shingle and increase resistance to UV and weather. Scratched surface 24 is just one example of the result of texturization of a shingle. Other texturizations may be achieved by the use of, for example, a rotating blade or tool on outer tread surface 23. The shingle may be coated-with any composition (25) that will improve the appearance or utility of the shingle. These compositions include color (paint), adhesives used either alone or in combination with other materials. For example, adhesives may be further coated with a granular or crushed material 26 like stone, sand, clay, cement, or other minerals to achieve a desired color, texture, UV or weather resistance or fire resistance.

The novel shingles of the present invention may be treated, for example, by coating to achieve a different aesthetic appearance and improve fire retardation. The material used to coat the shingle should bond to the rubber so that when cured, the coating material will remain pliable and will not crack or fail over time. In addition, the material should withstand elements of nature, including UV radiation. An example of a suitable material is a product manufactured by Goodyear Tire & Rubber Company of Akron, Ohio. The product is sold under the trademark PLIOTEC®. More particularly, PLIOTEC® 7217 is a styrene—acrylate polymer that adheres to rubber, is relatively elastic and can be tinted with color pigment to achieve colored shingles and/or can be coated with different granular products and substances.

As indicated above, PLIOTEC® can be applied as a mastic base which, in turn, can be coated with materials like crushed stone (i.e., limestone, sandstone, shale, granite or slate), portland cement, ceramic coated stone granules, iron oxides, aluminum oxides, graphite or a fire retardant and other suitable powder or aggregate. When the PLIOTEC® dries, the material that has been applied to the PLIOTEC® become an inegral part of the PLIOTEC® coating.

Texturizing the shingle before applying the coating and/or adhesive facilitates the bonding of the coating and/or adhesive to the shingle.

In one such embodiment of a coated shingle, PLIOTEC® was added to the shingle surface after the shingle had been buffed with a rasp to enhance the adherence of the PLIOTEC®. Sandstone was then crushed to a −10 mesh size, thereby providing a consistency with particle grains ranging from fine powder to course grit. The crushed sandstone was applied to the shingle still wet with the PLIOTEC®. The PLIOTEC® was allowed to dry with the result that it retained most of the crushed sandstone and produced a pleasing esthetic effect to the shingle (See FIG. 11). Thus, PLIOTEC® or any other adhesive may be applied to the shingles to improve the look or otherwise improve the utility, or the adhesive may be applied to a shingle and additional material added to the adhesive to bond the additional material to the shingle.

Tests have revealed that applicant's shingles with coatings (for example, crushed stone) utilizing PLIOTEC® as a bonding or adhesive agent retain the coating when subjected to accelerated weather testing which simulates a variety of climatic conditions including moisture, rain, dryness, temperature extremes, UV, etc. Moreover, certain coatings such as aluminum hydroxide or other oxides are good fire retardants. However, without using an adhesive agent (such as PLIOTEC®) they may not bond properly to the rubber shingle.

The PLIOTEC® or other bonding or adhesive agent may be applied in any manner to the shingle, which has, preferably, been buffed or otherwise treated or texturized to increase the adherence of the material to the shingle. That is, the PLIOTEC® or other adhesive or bonding agent, may be sprayed, rolled, dipped, brushed or blown on the shingle. Likewise, the crushed aggregate or other coating material may be applied in any suitable manner.

Applicants novel treated tire tread shingle may be applied to the roof, siding or any wall of a building structure in any suitable manner.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

What is claimed is:

1. A method of covering a pitched roof of a building structure, the method comprising the steps of:
   providing, from a vehicle tire, a multiplicity of tire tread sections, the tread sections having an outer surface and an inner surface and a longitudinal axis, the longitudinal axis generally parallel with the direction of the tread on the vehicle tire;
   securing, the multiplicity of tire tread sections to the roof of the building structure with the outer surface of the tire tread sections exposed, and with the longitudinal axis of the tire tread sections parallel to one another and to the pitch of the roof to form a first course or rows; and
   forming additional courses or rows, each comprised of tire tread sections with their outer surfaces exposed and their longitudinal axes parallel to the pitch of the roof.

2. The method of claim 1, wherein the providing step further includes providing a backing material member having a longitudinal axis and the method further includes, after the providing step, the step of forming a unitized panel having side edges by attaching the tire tread sections of the providing step to the backing material member such that the longitudinal axes of the tire tread sections are generally perpendicular to the longitudinal axis of the backing material member.

3. The method of claim 1 further including the step of treating at least some of the multiplicity of tire tread sections of the providing step in a manner that alters the visual appearance of the tire tread sections.

4. The method of claim 3 wherein the treating step includes the step of texturizing at least part of the outer surface of the multiplicity of tire tread sections by mechanical, thermal, chemical or other means.

5. The method of claim 3 wherein the treating step includes the step of coating the tire tread sections with an adhesive.

6. The method of claim 5 wherein the step of coating the tire tread sections with an adhesive includes the step of adding other materials to the adhesive.

7. The method of claim 6 wherein the other materials include granular materials.

8. The method of claim 3 wherein the treating step includes the step of applying paint to the tire tread sections.

9. A shingle formed from a vehicle tire, for covering the roof of a building structure, the shingle comprising:
   a tire tread section from the vehicle tire, the tire tread section having an outer surface bearing a tread, the outer surface of the tire tread section at least partially treated to alter the appearance of the tread, and an inner surface, the tire tread section having an upper edge, a lower edge, and two side edges, the two side edges parallel to one another and perpendicular to the upper edge, the upper and lower edges defining cuts through the vehicle tire in a direction generally transverse to a direction of the tread on the vehicle tire.

10. The shingle of claim 9 wherein the outer surface of the treated section at least partially comprises a coating.

11. The shingle of claim 10 wherein the coating of the outer surface of the tire tread section is an adhesive.

12. The shingle of claim 11 wherein the adhesive contains an aggregate.

13. The shingle of claim 10 wherein the coating is paint.

14. The single of claim 9 wherein the outer surface is texturized.

15. The shingle of claim 9, wherein the lower edge takes one of the following shapes: straight, rounded, or pointed.

16. The shingle of claim 9, wherein the tire tread section is treated with a fire retardant.

17. The shingle of claim 9, wherein the tire tread section is treated to provide coloration thereto.

18. A panel for covering a pitched roof of a building structure, the panel comprising:

a backing material member having a longitudinal axis, an outer and an inner surface, a top and a bottom edge, and two side edges;

a multiplicity of tire tread sections, each of the tire tread sections being generally rectangular and having a longitudinal axis, an outer surface, and a top edge; and means for attaching the multiple tire tread sections to said backing material member;

wherein the multiple tire tread sections are attached to the backing material member such that the longitudinal axis of the backing material member is perpendicular to the longitudinal axes of the multiple tire tread sections.

19. The panel of claim 18, wherein the backing material member is comprised of one of the following: plastic, metal, wood, or rubber.

20. The panel of claim 19, wherein the means for attaching are comprised of one of the following: mechanical fasteners or adhesives.

21. The panel of claim 18, wherein the backing material member comprises a first and second layer and wherein the means for attaching are capable of attaching the multiplicity of tire tread sections between the first and the second layers of the backing material member and wherein the multiplicity of tire tread sections are attached between the two layers of the backing material member aligning the top edges of the tire tread sections with the bottom edge of the backing material member.

22. The panel of claim 18, wherein the outer surfaces of the tire tread sections are texturized.

\* \* \* \* \*